3,484,400
STABILIZATION OF OXYMETHYLENE POLYMERS
George Walter Halek, Frankfurt, Germany, assignor to Celanese Corporation, New York, N.Y., a corporation of Delaware
No Drawing. Filed June 5, 1967, Ser. No. 643,380
Int. Cl. C08g 51/62, 51/58
U.S. Cl. 260—18                                    12 Claims

ABSTRACT OF THE DISCLOSURE

Oxymethylene polymers are stabilized with an improved additive combination comprising (1) a metal salt of non-nitrogenous organic acids or alcohols, and (2) certain phenolic antioxidants which have been found to be resistant to a possible color producing reaction with the antiacid metal salts or their decomposition products. The improved compositions are free of objectionable odors as well as possible discoloration resulting from reaction between the components of the additive combination.

CROSS-REFERENCE TO RELATED APPLICATION

The present invention represents an improvement over the generic invention disclosed and claimed in copending Ser. No. 550,576, filed May 16, 1966, of Michael J. Kakos, Jr., which is assigned to the same assignee as the instant invention.

BACKGROUND OF INVENTION

The invention described in copending Ser. No. 550,576, filed May 16, 1966, has been found to substantially enhance the thermal stability of oxymethylene polymers without causing to be imparted to the polymer the objectionable amine-like or "fishy" odor heretofore commonly encountered with oxymethylene polymers. Consequently, the use of certain metal salts of non-nitrogenous organic acids or alcohols as thermal stabilizers has widened the field of utility of oxymethylene polymers. Such extended utility has been of particular importance in the manufacture of molded containers such as, for example, blow molded plastic bottles.

Oxymethylene polymers having recurring —$CH_2O$— units, have been known for many years. They may be prepared by the polymerization of anhydrous formaldehyde or by the polymerization of trioxane, which is a cyclic trimer of formaldehyde. Oxymethylene polymers (both homopolymers and copolymers) vary in physical properties such as thermal stability, molecular weight, molding characteristics, color and the like, depending, in part, upon their method of preparation.

High-molecular-weight oxymethylene polymers have been prepared by polymerizing trioxane in the presence of certain fluoride catalysts. They may also be prepared in high yields and at rapid reaction rates by the use of catalysts comprising boron fluoride coordination complexes with organic compounds, as described in U.S. Patent No. 2,989,506 of Donald E. Hudgin and Frank M. Berardinelli.

Other methods of preparing oxymethylene polymers are disclosed by Kern et al. in *Angewandte Chemie*, 73 (6) 177–186 (Mar. 21, 1961), and in Sittig, "Polyacetals: What You Should Know," *Petroleum Refiner*, 41 11, 131–170 (November 1962), including polymers containing repeating carbon-to-carbon single bonds in the polymer chain and which are made by copolymerizing trioxane with cyclic ethers, e.g., dioxane, lactones, e.g., beta-propiolactone, anhydrides, e.g., cyclic adipic anhydride, and ethylenically unsaturated compounds, e.g., styrene, vinyl acetate, vinyl methyl ketone, acrolein, etc.

Also contemplated in the production of modified oxyalkylene, specifically oxymethylene, polymeric compositions of the instant invention are oxymethylene polymers the end groups of which are reacted or "capped" with, for example, a carboxylic acid or a monomeric ether. Typical capping agents are alkanoic acids (e.g., acetic acid), which form ester end groups, and dialkyl ethers (e.g., dimethyl ether), which form ether end groups.

Still other oxymethylene polymers, more particularly copolymers, which are adapted for use in producing the modified oxymethylene polymers of this invention are those which are prepared as described in U.S. Patent No. 3,027,352 of Walling et al. by copolymerizing, for example, trioxane with any of various cyclic ethers having at least two adjacent carbon atoms, e.g., ethylene oxide, dioxolane, and the like.

It will be apparent to those skilled in the art that these various oxyalkylene polymers (homopolymers and copolymers, which are often designated generically herein merely as "polymers") have varying physical properties as indicated hereinbefore; and a polymeric composition or article, e.g., a molding composition or molded article, which is satisfactory for one particular end-use may be partly or wholly unsatisfactory for a different end-use. For instance, it has been found that there is a tendency for oxymethylene polymers stabilized according to the teachings of copending Ser. No. 550,576, filed May 16, 1966, in spite of enhanced thermal stability, to discolor upon extended exposure to elevated temperatures. Such discoloration has accordingly limited the extent of the increased utility realized by such odor-free oxymethylene polymer compositions to applications (1) in which the polymer is exposed to relatively low temperatures, or (2) in which color is of only minor importance. In order to satisfy the needs of many molders or plastic fabricators, it is essential, however, that the product be capable of withstanding discoloration upon exposure to rather severe elevated temperatures sometimes encountered during use. Such resistance to discoloration is of prime importance when a relatively white or unchanging pastel article is desired.

It is an object of the invention to provide an oxymethylene polymer composition of improved color stability.

It is an object of the invention to provide a stabilized oxymethylene polymer composition and process for producing the same in which the phenolic antioxidant present in the composition is resistant to a color producing reaction with the non-nitrogenous antiacid stabilizing additive of the stabilizer system.

It is another object of the invention to provide a stabilized oxymethylene polymer composition in which the stabilizers selected for inclusion therein are of low extractability and do not exude excessively from articles molded or otherwise fabricated from the same.

It is a further object of the invention to provide a moldable oxymethylene polymer composition which does not excessively build-up or deposit upon the surfaces of a mold while the composition undergoes molding.

It is an additional object of the invention to provide a stabilized oxymethylene polymer composition which is free of objectionable odor emitting characteristics as well as discoloration resulting from coreaction of the various components of the stabilizer system.

These and other objects, as well as the scope, nature, and utilization of the invention will be apparent from the following detailed description and appended claims.

SUMMARY OF INVENTION

It has now been found that an improved stabilized polymer composition comprises the following components in a substantially homogeneous admixture;

(A) A normally solid, oxymethylene polymer which in the absence of a thermal stabilizer degrades excessively when heated to temperatures ranging up to 230° C., and which in the presence of a stabilizing amount of a nitrogen-containing thermal stabilizer such as those of the amidogen type emits an objectionable odor;

(B) A stabilizing additive of the kind and in the amount effective in decreasing the degradation of the polymer and in the elimination of odor, with the additive comprising at least one member of the group consisting of (a) metal salts of non-nitrogenous organic acids having from 2 through 30 carbon atoms and at least one

group, and (b) metal salts of non-nitrogenous alcohols having from 2 through 30 carbon atoms, with the metal salts of (a) and (b) having the further characteristic of being formic acid acceptors; and (C) An effective amount of a phenolic antioxidant which is resistant to a color producing reaction with the B stabilizing additive or the decomposition products thereof selected from the group consisting of para bisphenols, para trisphenols, and para tetrakisphenols.

DESCRIPTION OF PREFERRED EMBODIMENTS

The oxymethylene polymer

The oxymethylene polymer that is modified in practicing this invention may be,, as previously has been indicated, homopolymeric oxymethylene or an oxymethylene copolymer. The two are not the full equivalent of each other as the main or primary component in the stabilized polymeric compositions of this invention. The preferred primary component is a coplymer of oxymethylene.

The oxymethylene polymers useful in this invention may be prepared as broadly and more specifically described earlier in this specification and in the citations therein given. An oxymethylene copolymer of the kind disclosed and claimed in the aforementioned Walling et et al. patent is especially suitable for use as the copolymer that is modified in producing the stabilized polymeric compositions with which this invention is concerned.

The oxymethylene copolymer may be defined more specifically as a normally solid, substantially water-insoluble copolymer, the repeating units of which consist essentially of (A) —$OCH_2$— groups interspersed with (B) groups represented by the general formula

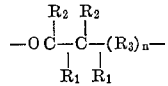

wherein each $R_1$ and $R_2$ is selected from the group consisting of hydrogen, lower alkyl and halogen-substituted lower alkyl radicals, each $R_3$ is selected from the group consisting of methylene oxymethylene, lower alkyl and haloalkyl-substituted methylene, and lower alkyl and haloalkyl-substituted oxymethylene radicals, and $n$ is an integer from zero to three, inclusive. Each lower alkyl radical preferably has from one to two carbon atoms, inclusive. The —$OCH_2$— units of (A) constitute from 85% to 99.9% of the recurring units. The units of (B) are incorporated into the copolymer during the step of copolymerization to produce the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers employed in making the oxymethylene copolymer are those represented by the general formula

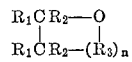

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three, inclusive.

The preferred cyclic ethers used in the preparation of the oxymethylene copolymers are ethylene oxide and 1,3-dioxolane, which may be represented by the formula

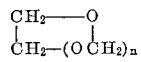

wherein $n$ represents an integer from zero to two, inclusive. Other cyclic ethers that may be employed are 1,4-dioxane, trimethylene oxide, tetramethylene oxide, pentamethylene oxide, 1,2-propylene oxide, 1,2-butylene oxide, 1,3-butylene oxide, and 2,2-di-(chloromethyl)-1,3-propylene oxide.

The preferred catalysts used in preparing the oxymethylene copolymers are the aforementioned boron fluoride coordinate complexes, numerous examples of which are given in the previously identified Walling et al. patent. Reference is made to this patent for further information concerning the polymerization conditions, amount of catalyst employed, etc.

The term "oxymethylene" as used in the specification and claims of this application, unless it is clear from the context that a more specific meaning is intended, includes substituted oxymethylene, wherein the substitutes are inert with respect of the reactions in question; that is, the substituents are free from any interfering functional group or groups that would cause or result in the occurrence of undesirable reactions.

Also, as used in the specification and claims of this application, the term "copolymer" means polymers obtained by copolymerization of two or more different monomers (i.e., polymers containing in their molecular structure two or more different monomer units), and includes terpolymers, tetrapolymers and higher multi-component polymers. The term "polymer" (unless it is clear from the context that the homopolymer or a copolymer is intended) includes within its meaning both homopolymers and copolymers.

The oxymethylene polymers that are modified to produce the compositions of this invention are thermoplastic materials having a melting point of at least 150° C., and normally are millable or processable at a temperature of about 200° C. They have a number average molecular weight of at least 10,000. The preferred oxymethylene polymers have an inherent viscosity of at least 1.0 (measured at 60° C. in a 0.1 weight percent solution in p-chlorophenol containing 2 weight percent of alpha-pinene).

The oxymethylene polymer component of the compositions of this invention may be, if desired, oxymethylene polymers that have been preliminarily stabilized to a substantial degree, prior to admixture with stabilizing additive and antioxidant to produce the compositions of this invention. Such stabilizing technique may take the form of stabilization by degradation of the molecular ends of the polymer chain to a point where a relatively stable carbon-to-carbon linkage exists at each end. For example, such degradation may be effected by hydrolysis as disclosed in the copending application of Frank M. Berardinelli, Ser. No. 372,390, filed June 3, 1964, as a continuation-in-part of application Ser. No. 102,097, filed Apr. 11, 1961, now abandoned. Application Ser. No. 372,390 is assigned to the same assignee as the present invention, and by this cross-reference is made a part of the disclosure of the instant application. It is also within the purview of the invention to utilize oxymethylene polymers which have been "end capped" by known methods of etherification and esterification.

Antiacid additive

The antiacid stabilizing additive which is blended or otherwise admixed with the oxymethylene polymer to form the compositions of this invention includes as an essential component of the admixture one or more metal salts of (A) a non-nitrogenous organic acid having from 2 through 30 carbon atoms and at least one

group (preferably, also, at least one primary, secondary or tertiary alcoholic hydroxyl group); and/or (B) one or more metal salts of non-nitrogenous alcohols (primary, secondary or tertiary alcohols) having from 2 through 30 carbon atoms. The metal salts of (B) are often designated as alcoholates. As previously has been mentioned, the metal salts of both (A) and (B) are characterized as being formic acid acceptors. Such metal salts are capable of thermally stabilizing oxymethylene polymers without emitting an objectionable odor as commonly produced when thermal stabilizers or chain-scission inhibitors of the amidogen (amine or amide) type are employed.

The metal salts used in practicing this invention are either commercially available or can be produced in known manner. Advantageously the cation of such salts is an alkali metal (sodium, potassium, lithium, rubidium or cesium) or an alkaline-earth metal. The term "alkaline-earth metal," as used in this specification and in the appended claims, includes within its meaning not only calcium, strontium and barium but also magnesium, which latter element is sometimes excluded, in chemical textbooks and publications, from the alkaline-earth family of metals. Other salts that may be used (especially in combination with alkali-metal or alkaline-earth-metal salts) are those wherein the cation is, for example, beryllium, zinc, aluminum, titanium, germanium, zirconium or tin. The available evidence indicates that optimum thermal stabilization of the oxymethylene polymer is obtained when the cation is one which forms a relatively strong base as do the alkali metals and the alkaline-earth metals.

The metal salt component of the stabilized polymer composition may be one or more metal salts of the aforementioned non-nitrogenous organic acids and/or one or more metal salts of the aforesaid nonnitrogenous alcohols. The organic acid may be monobasic or polybasic, saturated or unsaturated, branched-chain or straight-chain, and substituted or unsubstituted provided that any substituent or substituents are inert during formulation; that is, are free from any interfering functional group or groups that would cause or result in the occurrence of undesirable side reactions. For example, —OH groups are permissible substituents; and, in fact, the available evidence indicates that they are desirable. Or, the substituent may be for instance, an —OR group where R represents an alkyl radical such as a lower alkyl radical, specifically a $C_1$ through $C_5$ alkyl radical.

Illustrative examples of non-nitrogenous organic acids that may be employed in producing the aforementioned metal salts are the unsubstituted, straight-chain, saturated, aliphatic, monocarboxylic acids having from 2 through 30 carbon atoms, viz., ethanoic, propanoic, butanoic and higher members of the homologous series through triacontanoic (melissic), $C_{29}H_{59}COOH$; the corresponding branched-chain, saturated, aliphatic, monocarboxylic acids, e.g., alpha-methylbutyric (2-methylbutanoic), isovaleric (3-methylbutanoic), pivalic (2,2-dimethylpropanoic) and 2-ethylhexoic (octoic); the monoethylenically unsaturated, aliphatic, monocarboxylic acids having up to and including about 30 carbon atoms, e.g., 4 decenoic, caproleic, 10-undecenoic, lauroleic, 5-tetradecenoic, myristoleic, palmitoleic, cis-6-octadecenoic, trans-6-octadecenoic, oleic, elaidic, trans-11-octadecenoic, cis-9-eicosenoic, 11 docosenoic, erucic, brassidic, cis-15-tetraosenoic, and 17-hexacosenoic.

Still other examples of useful non-nitrogenous organic acids that may be employed in making the metal salts are the di-, tri- and higher polyethylenically unsaturated aliphatic, monocarboxylic acids having up to and including about 30 carbon atoms, e.g., sorbic, linoleic, linolelaidic, hiragonic, alpha-eleostearic, beta-eleostearic, punicic, linolenic, elaidolinolenic, pseudoeleostearic, morocic, alpha-parinaric, beta-parinaric, arachidonic, clupanodonic and nisinic.

As indicated hereinbefore, the metal salts of hydroxy-substituted carboxylic acids having up to and including 30 carbon atoms have been found to be particularly suitable for use in practicing this invention and are not the full equivalent of the other metal salts. The metal ricinoleates, more particularly the ricinoleates of the alkaline-earth metals, and specifically calcium ricinoleate, are outstanding in their utility as a modifier of an oxymethylene polymer.

Ricinoleic acid,

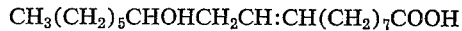

is therefore the preferred hydroxy-substituted carboxylic acid, the metal salt of which is especially valuable in carrying the instant invention into effect. Additional specific examples of other acids of this same sub-group that similarly may be employed are alpha-hydroxydecanoic, 3-hydroxydecanoic acid having the formula

12-hydroxydodecanoic (sabinic), 16-hydroxyhexadecanoic (juniperic), 10-hydroxyhexadecanoic, 12-hydroxyoctadecanoic, 10-hydroxy-8-octadecenoic, DL-erythro-9, 10-dihydroxyoctadecanoic and lanoceric acids.

Illustrative examples of other substituted non-nitrogenous organic acids, the metal salts of which may be employed in practicing this invention, are the various keto-substituted aliphatic monocarboxylic acids, e.g., pyruvic, acetoacetic, 4-oxooctadecanoic, 6-oxooctadecanoic, 10-oxooctadecanoic, 17-oxooctadecanoic, 13-oxodotriacontanoic, 13-oxohexatetracontanoic, alpha-licanic, 6,7-dioxooctadecanoic and 9,10-dioxooctadecanoic acids.

Examples of still other monocarboxylic acids that may be used in making the metal salts are the various aromatic monocarboxylic acids, e.g., benzoic acid, ortho-, meta- and para-toluic acids, the various hydoxy-substituted toluic acids including the 2- and 3-para-toluic acids, etc.; the aryl-substituted aliphatic monocarboxylic acids, e.g., phenyl-acetic (alpha-toluic) acid etc.; dihydroxy monocarboxylic acids, e.g., glyceric acid; and others up to 30 carbon atoms (preferably up to not more than about 20 carbon atoms), that will be apparent to those skilled in the art from the foregoing illustrative examples.

Instead of using metal salts of monobasic acids, one may employ metal salts of di-, tri- and higher polybasic acids. Examples of such acids are the saturated dicarboxylic acids having from 2 through 30 carbon atoms, including oxalic, malonic, succinic, glutatric, adipic, pimelic, suberic, sebacic, azelaic and higher members of the homologous series up to and including about 30 carbon atoms; tricarballylic and other higher polycarboxylic acids; ethylenically unsaturated poly-basic acids, e.g., fumaric, maleic, itaconic, citraconic, mesaconic and aconitic acids; aromatic polycarboxylic acids, e.g., phthalic, terephthalic, isophthalic and chlorophthalic acids; and the various hydroxy-substituted polycarboxylic acids, e.g., citric, tartronic, malic, tartaric, dihydroxy-succinic, saccharic, mucic, etc.; as well as other acids having from 2 up to about 30 carbon atoms that will be apparent to the skilled chemist from these illustrative examples.

Illustrative examples of non-nitrogenous alcohols of which the metal salts or alcoholates can be made and used in practicing this invention are those alcohols which are free from a carboxyl

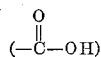

group or groups, but otherwise correspond to the carboxylic acids hereinbefore given by way of illustration. Among such alcohols may be mentioned the straight-chain and branched-chain, saturated, monohydric alcohols, such as ethanol and the normal and isomeric forms of propanol through triacontanol; and the mono-, di- and higher polyethylenically unsaturated monohydric alcohols corresponding to the aforementioned saturated monohydric alcohols including, for example, allyl, methallyl, crotyl, cinnamyl, alpha-phenylallyl, 3-buten-2-ol, 1-penten-3-ol,3-penten-2-ol, 4-penten-1-ol, 4-penten-2-ol, 3-ethyl-5-hexen-3-ol and higher members of the homologous series.

Still other examples include the non-nitrogenous alcohol-ethers, e.g., the monoethyl, -butyl, -phenyl, and -benzyl ethers of ethylene glycol and of diethylene glycol, propylene glycol monomethyl ether, pentylene glycol monoethyl ether, decylene glycol monophenyl ether and dibutylene glycol monobutyl ether.

Other specific examples include the various non-nitrogenous polyhydric alcohols containing up to about 30 carbon atoms, e.g., ethylene glycol, diethylene glycol, triethylene glycol, tetraethylene glycol, hexamethylene glycol, decamethylene glycol, 2-ethyl-1,3-hexanediol, 1,3-butylene glycol, pentaethylene glycol, heptaethylene glycol, octaethylene glycol, decaethylene glycol, 2-butyl-1,3-octanediol, 2-ethyl-2-methylol-1-hexanol, 6-methyl-2,4-heptanediol, glycerol, orythritol, pentaerythritol, dipentaerythritol, adonitol, xylitol, arabitol, mannitol, dulcitol, sorbitol, trimethylolpropane, cocceryl alcohol, and others that will be apparent to those skilled in the art from the foregoing illustrative examples.

The use of metal salts of non-nitrogenous ethylnoid (acetylenically unsaturated) aliphatic carboxylic acids and metal salts of ethynoid alcohols, which salts are available or can be prepared, is not precluded in producing the stabilized oxymethylene polymer compositions of this invention. Also within the scope of this invention is the use of the alkali-metal, alkaline earth-metal and other metal salts of alicyclic (e.g., naphthenic) compounds containing at least one carboxylic acid group and/or at least one alcoholic hydroxyl group.

The kind and amount of stabilizing additive which is incorporated in the oxymethylene polymer has been functionally described hereinbefore, and it has been pointed out that it comprises at least one member of the group consisting of the aforementioned metal salts of non-nitrogenous organic acids and metal salts of non-nitrogenous alcohols. More particularly it may be stated that the metal-salt component of the stabilizing additive is a small, positive, stabilizing amount up to about 5 percent by weight of the oxymethylene polymer, e.g., from 0.001 to 5 percent, and still more particularly 0.01 to 3 percent by weight of the polymer. The preferred amount of the metal component is a stabilizing amount (e.g., 0.01–0.05%) up to 1.5 percent by weight of the oxymethylene polymer. Higher amounts, such as percentages of the order of 3 to 5 weight percent of the polymer, may sometimes be necessary or desirable in stabilizing pigmented oxymethylene polymer concentrates, the amount varying depending upon, for example, the acidic characteristics of the particular pigment employed.

It is preferred that the stabilizing additive employed in practicing this invention be a normal or full metal salt of the defined non-nitrogenous organic acid or alcohol. However, the use of partial salts also is contemplated, that is, metal salts of the defined acids and alcohols wherein only part (e.g., ½, ⅓, ⅔, ¼, ¾, etc.) of the total carboxylic and/or alcoholic groups of the acid, alcohol or acid-alcohol have been reacted to form a salt thereof. When such partial salts are used, then ordinarily a larger amount of stabilizing additive is required in order to attain the same degree of thermal stabilization.

Phenolic antioxidant additive

The second component of the additive combination according to the present invention is a phenolic antioxidant which is resistant to a color producing reaction with the antiacid stabilizing additive or the decomposition products thereof. It has been found that discoloration encountered in oxymethylene polymers stabilized with the metal salts of the non-nitrogenous organic acids or alcohols heretofore described may be attributed to the combined presence of certain phenolic antioxidants within the stabilizer system. More specifically, it has been found after extended experimentation that phenolic antioxidants possessing ortho phenol groups tend to enter into a color producing reaction with the non-nitrogenous thermal stabilizers or the decomposition products thereof. For example, an ortho-bisphenol, ortho-trisphenol, or ortho-tetrakis phenol antioxidant in the presence of such non-nitrogenous metal salts has been found to undergo deprotonation and dehydration to form a cyclic reaction product possessing a conjugated resonance system which commonly imparts an orange-yellow coloration. This ring formation reaction is believed to occur at elevated temperatures between adjoining ortho hydroxy groups and the metal salts or their decomposition products, such as metal oxides. According to the present invention, this ring formation and the concomitant discoloration tendency is eliminated and an improved composition produced by selecting the phenolic antioxidant from the group consisting of para bisphenols, para trisphenols, and para tetrakisphenols. Stabilized oxymethylene compositions containing the heretofore defined non-nitrogenous antiacid stabilizers possess enhanced thermal stability as described in detail in copending Ser. No. 550,576 filed May 16, 1966, and according to the present invention effectively overcome the above-identified discoloration problem.

The bisphenol antioxidant additives which are utilized in conjunction with the non-nitrogenous antiacid additive in the present invention may be substituted alkylene para bisphenols. For example, substituted alkylene para bisphenols may possess a 4,4'-alkylene-bis(2,6-dialkylo phenol) structure having 1 to 4 carbon atoms in the alkylene group and in each alkyl group. Illustrative examples of such antioxidants include: 4,4'-methylene-bis(2-methyl-6-tertiary butyl phenol); 4,4'-methylene-bis(2-ethyl-6-tertiary butyl phenol); 4,4'-methylene-bis(2-propyl-6-tertiary butyl phenol); 4,4'-methylene-bis(2,6-di-tertiary butyl phenol); 4,4'-ethylene-bis(2-methyl-6-propyl phenol); 4,4' - ethylene-bis(2,6-di-tertiary butyl phenol); etc. Para bisphenols may possess a 4,4'-alkylene-bis(3,5-dialkyl phenol) structure having 1 to 4 carbon atoms in the alkylene group and in each alkyl group. An illustrative example of such antioxidants is 4,4'-methylene-bis(3,5-dimethyl phenol). Other suitable para bisphenols may possess alkyl substituents or branches containing up to about five carbon atoms upon the alkylene group linking the respective benzene rings. An illustrative example of such antioxidants is 4,4'-butylidene-bis(6-tertiary butyl-3-methyl phenol) which is marketed under the trade designation of "Santowhite Powder" by the Monsanto Co. The para bisphenols may also possess a structure in which the respective benzene rings are directly joined without the presence of a linking alkylene group. An illustrative example of such antioxidants is 4,4'-bis(2,6-di-tertiary butyl phenol) which is marketed under the trade designation of "Ethyl Antioxidant 712" by the Ethyl Corporation. The benzene rings of suitable para bisphenols may also be joined by ether linkages containing up to about 4 carbon atoms. An illustrative example of such antioxidants is 4,4'-methylene oxymethylene bis(2,6-di-tertiary butyl phenol) which is marketed under the trade designation of "Ionox 201." Additionally the benzene rings of suitable para bisphenols may be joined by a thio linkage. Illustrative examples of suitable thio para bisphenols include: 4,4'-thio-bis(6-tertiary butyl-2-methyl phenol); 4,4'-thio-bis(6-tertiary butyl-3-methyl phenol); and 4,4'-thio-bis(3,6-di-secondary amyl phenol).

Illustrative examples of para trisphenols suitable for use in the present invention include: 1,3,5-trimethyl-2,4,6-tris(3,5-di-tertiary butyl-4-hydroxybenzyl) benzene; 1,3,5-di-ethyl-2,4,6-tris(3,5 - di-tertiary butyl-4-hydroxybenzyl) benzene; 1,3,5-tripropyl-2,4,6-tris(3,5-di-tertiary butyl-4-hydroxybenzyl) benzene; 1,3,5-trimethyl-2,4,6-tris(3,5-dimethyl-4-hydroxybenzyl) benzene; 1,3,5-trimethyl-2,4,6-tris(2,6-dimethyl-4-hydroxybenzyl) benzene; 2,4,6-tris(3,5-di-tertiary butyl-4-hydroxybenzyl) benzene; 1,3,5-trimethyl-2,4,6-tris(2,3,5,6 - tetramethyl-4-hydroxlbenzyl) benzene; 1,3,5-trimethyl-2,4,6-tris(3,5-di-tertiary butyl-4-hydroxyphenyl propylene) benzene, etc.

Illustrative examples of para tetrakis phenols suitable for use in the present invention include: 2,4,6-tris(3,5-di-tertiary butyl-4-hydroxybenzyl) phenol marketed under the trade designation of "Ionox 312," and condensation products of pentaerythritol with hindered phenols of the following structure:

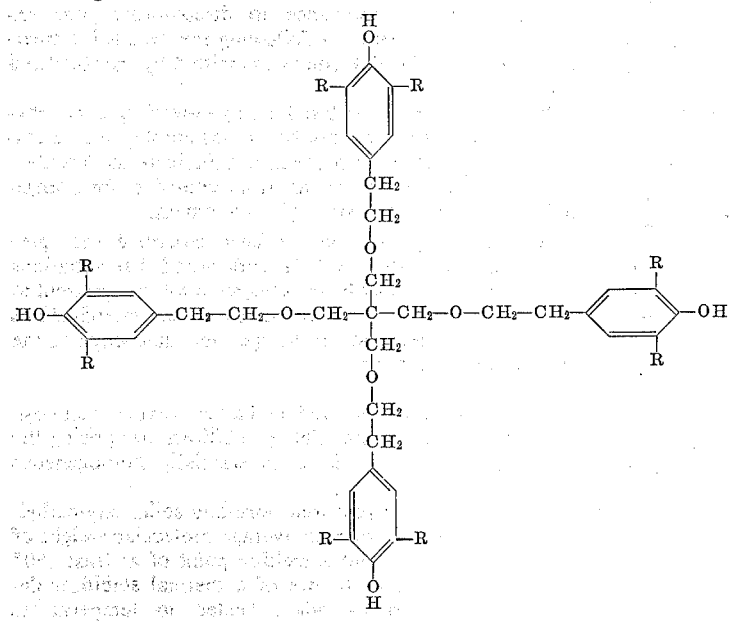

in which each R is a lower alkyl group containing one to about 5 carbon atoms. The particularly preferred para tetrakis phenol is tetrakis(1-ethylene oxymethylene-3,5-di-tertiary butyl-4-hydroxyphenyl) methane which is marketed under the trade designations of "Irganox 1010" by the Geigy Chemical Corporation.

The amount of phenolic antioxidant additive employed in the stabilizer combination according to the present invention may range from about 0.05 to about 5 percent based upon the weight of the oxymethylene polymer. In a preferred embodiment the para phenol is present in a concentration of about 0.05 to about 2.0 percent by weight, and in a particularly preferred embodiment in a concentration of about 0.3 to about 1.0 percent based upon the weight of the oxymethylene polymer.

Formation of composition

The stabilized polymeric compositions of this invention are prepared by admixing the ingredients thereof in any suitable manner whereby a substantially homogeneous composition is obtained. For example, the antiacid stabilizing additive and the para phenolic antioxidant additive may be incorporated into the oxymethylene polymer by dissolving both the polymer and the additives in a common solvent, and thereafter evaporating the solution to dryness. Alternatively, the additives may be incorporated into the polymer by applying a solution of the thermal stabilizer to finely divided polymer, as in a slurry, and thereafter filtering the polymer and evaporating it to dryness.

Another suitable method of admixing the components of the composition, especially when the additives are dry solids, is to blend the additives into the plastic polymer while the latter is being kneaded, e.g., on heated rolls or during passage through screw-type or other type of mixer-extruder apparatus. Or, when the stabilizer additives are finely divided solids, they may be blended with the finely divided polymer in any suitable blending apparatus until a substantially homogeneous composition results.

The thermally stabilized compositions of this invention may also include, if desired, plasticizers, fillers, pigments, or other stabilizers such as those which are stabilizers against degradation by ultraviolet (U.V.) light. Thus, the oxymethylene polymer may be stabilized against such light degradation by incorporating therein a U.V. light-stabilizing amount of a 2-hydroxybenzophenone, e.g., about 1% by weight of 2,2'-dihydroxy-4,4'-dimethoxybenzophenone.

In general, the thermal stability of the additive-modified oxymethylene polymer compositions of this invention in which has been incorporated a non-nitrogenous thermal stabilizer and a para phenolic antioxidant is comparable with the thermal stability of polymeric oxymethylene compositions which are the same as those of this invention except that a nitrogenous stabilizer (e.g., cyanoguanidine or a combination of cyanoguanidine and melamine) is used instead of the non-nitrogenous metal salts required in the applicant's compositions. For example, the starting or unmodified oxymethylene polymer may, when it is a copolymer, have a degradation rate ($K_d$) over the first 45 minutes of heating at 230° C. greater than 1 weight percent/minute (or even greater than 3 weight percent/minute with some copolymers, and even higher than this latter value in the case of homopolymers). In marked contrast, the modified polymer compositions of this invention usually have a $K_d$ vaue, when heated as briefly described in the preceding sentence, of less than 0.1 weight percent/minute; and values as low as 0.005 weight percent/minute have been obtained with a particular concentration of a preferred metal salt, viz., an alkaline earth-metal salt of an aliphatic carboxylic acid having an alcoholic hydroxyl substituent in the aliphatic chain, and by which is meant specifically calcium ricinoleate.

The following examples are given as specific illustrations of the improved compositions of the invention. It should be understood, however, that the invention is not limited to the specific details set forth in the examples.

EXAMPLE I 100 parts by weight of oxymethylene copolymer formed from trioxane and ethylene oxide were weighed and placed in a tumble-type powder mixer. The copolymer contained 2 weight percent (about 1 mole percent) of monomeric units derived from ethylene oxide. The copolymer was prepared according to the teachings of Walling et al. U.S. Patent No. 3,027,352. It was in a flake form, and about 70 percent by weight of the copolymer passed through a 40-mesh screen. It had an inherent viscosity of about 1.2 (measured at 60° C. in 0.1 weight percent solution in p-chlorophenol containing 2 weight percent of alpha-pinene). It had a melt index of about 9.0. (The apparatus used and method of determining the melt index are described in ASTM D–1238–57T.)

0.1 part by weight of finely divided calcium stearate and 0.5 part by weight of finely divided 4,4'-butylidene-bis(6-tertiary butyl-3-methyl phenol) which is a para bisphenol marketed by the Monsanto Co. under the trade designation of "Santowhite Powder" were weighted and added to the mixer containing the oxymethylene copolymer. The blend was tumbled for ten minutes to obtain a uniform admixture, and then fed to a plastograph mixer maintained at about 200–210° C. under a nitrogen blanket. Within seven minutes a molten uniform mass was obtained. The mass of stabilized polymer composition was next allowed to solidify and cool to room temperature.

The composition was compression molded into 60 mil plaques and cut into 1 x 3 inch strips. A strip of the stabilized plastic was next placed in a circulating hot air oven for 240 hours of heat aging while maintained at 240° F. upon removal from the oven the stabilized strip appeared white to visual observation. Upon testing with a standard Hunter Color Meter the following readings were obtained:

| $L$ | $a$ | $b$ |
|---|---|---|
| 85.3 | −5.6 | 16.7 | which compared favorably to the following values obtained from testing a control strip which was not exposed to heat aging conditions:

| $L$ | $a$ | $b$ |
|---|---|---|
| 88.6 | −4.2 | 6.9 |

No objectionable odor was emitted by the stabilized composition.

For comparative purposes an ortho bisphenol was substiuted for the para bisphenol and the resulting admixture was heat aged as described above. More specifically, 0.5 part by weight of 2,2'-methylene bis(4-methyl-6 tertiary butyl phenol) was substituted for the 4,4' butylidene-bis (6-tertiary butyl-3-methyl phenol) component. All other conditions were identical to those described above. Prior to the heating aging treatment the color of the molded product was generally satisfactory and the following readings were obtained by the use of a standard Hunter Color Meter:

| $L$ | $a$ | $b$ |
|---|---|---|
| 85.7 | −1.7 | 6.7 |

However, following heat aging at 240° F. for 240 hours the sample was orange-red in color and the following readings were obtained by the use of a Hunter Color Meter:

| $L$ | $a$ | $b$ |
|---|---|---|
| 69.9 | +1.9 | 18.7 |

EXAMPLE II

A stabilized oxymethylene copolymer composition was prepared and color tested as described in Example I employing 100 parts by weight of the oxymethylene copolymer, 0.1 part by weight of finely divided calcium stearate, and 0.5 part by weight of tetrakis(1-ethylene oxymethylene - 3,5 - di-tertiary butyl-4 - hydroxyphenyl) methane which is a paratetrakis phenol marketed under the trade designation of "Irganox 1010" by the Geigy Chemical Corporation. Prior to heat aging the following satisfactory Hunter color readings were obtained:

| $L$ | $a$ | $b$ |
|---|---|---|
| 89.1 | −2.8 | 5.8 |

After the heat aging treatment the following Hunter color readings were obtained which indicate resistance to discoloration:

| $L$ | $a$ | $b$ |
|---|---|---|
| 85.4 | −6.0 | 21.1 |

No objectionable odor was emitted by the stabilized composition.

EXAMPLE III

An oxymethylene copolymer composition was prepared and color tested as described in Example I with the exception that 0.1 part by weight of calcium ricinoleate was substituted for the calcium stearate component of the stabilizer system. Resistance to discoloration was exhibited prior to as well as following the heat aging treatment. No objectionable odor was emitted by the stabilized composition.

When 2,2'-methylene bis(4-methyl-6-tertiary butyl phenol) which is an ortho bisphenol was employed in a stabilizer combination with calcium ricinoleate as described above the resulting composition discolored to an orange-red color during the heat aging treatment.

Although the invention has been described with preferred embodiments, it will be understood that variations and modifications may be resorted to as will be apparent to those skilled in the art. Such variations and modifications are to be considered within the purview and scope of the claims appended hereto.

I claim:

1. An improved stabilized moldable polymer composition free of nitrogen-containing stabilizers comprising the following components in a substantially homogeneous admixture:
   (A) a previously prepared normally solid, oxymethylene polymer having an average molecular weight of at least 10,000 and a melting point of at least 150° C. which in the absence of a thermal stabilizer degrades excessively when heated to temperatures ranging up to 230° C., and which in the presence of a stabilizing amount of a nitrogen-containing thermal stabilizer such as those of the amidogen type emits an objectionable odor;
   (B) about 0.001 to about 5 percent based on the weight of said polymer of a stabilizing additive selected from the group consisting of metal salts of non-nitrogenous organic acids having from 2 to 30 carbon atoms and at least one carboxy group and a member selected from the group consisting of metal salts of non-nitrogenous alcohols having from 2 to 30 carbon atoms, wherein the metal is selected from the groups consisting of alkali metals, alkaline-earth metals, zinc, aluminum, and tin and said metal salts of non-nitrogenous organic acids and alcohols are formic acid acceptors; and
   (C) about 0.05 to about 5 percent based upon the weight of said polymer of a phenolic antioxidant which is resistant to a color producing reaction with said (B) stabilizing additive or the decomposition products thereof selected from the group consisting of para bisphenols, paratrisphenols, and paratetrakisphenols.

2. An improved composition according to claim 1 wherein said oxymethylene polymer is a normally solid, substantially water-insoluble copolymer, the repeating units of which consist essentially of (I) —OCH₂— groups interspersed with (II) groups represented by the general formula

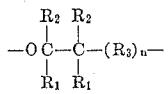

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three, inclusive, each lower alkyl radical having from one to two carbon atoms, inclusive, said groups of (I) constituting from 85% to 99.9% of the recurring units, said groups of (II) being incorporated during the step of copolymerization to produce said copolymer by the opening up of the ring of a cyclic ether having adjacent carbon atoms by the breaking of an oxygen-to-carbon linkage.

3. An improved composition according to claim 1 wherein said stabilizing additive comprises a metal salt of a non-nitrogenous organic acid having from 2 through 30 carbon atoms, at least one

group and at least one

group.

4. An improved composition according to claim 1 wherein said phenolic antioxidant is a 4,4'-alkylene-bis-(2,6-dialkyl phenol) having 1 to 4 carbon atoms in its alkaylene group and in each of its alkyl groups.

5. An improved composition according to claim 1 wherein said stabilizing additive is calcium ricinoleate.

6. An improved stabilized moldable polymer composition free of nitrogen-containing stabilizers comprising the following components in a substantially homogeneous admixture:
(A) a previously prepared normally solid, substantially water-insoluble oxymethylene copolymer of trioxane with from about 0.1 to about 15 mole percent of a cyclic ether having a molecular weight of at least 10,000 and a melting point of at least 150° C. represented by the formula

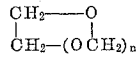

wherein $n$ represents an integer from zero to two, inclusive;
(B) about 0.001 to about 5 percent based on the weight of said polymer of a stabilizing additive selected from the group consisting of metal salts of non-nitrogenous organic acids having from 2 to 30 carbon atoms and at least one carboxy group and a member selected from the group consisting of metal salts of non-nitrogenous alcohols having from 2 to 30 carbon atoms, wherein the metal is selected from the group consisting of alkali metals, alkaline-earth metals, zinc, aluminum, and tin and said metal salts of non-nitrogenous organic acids and alcohols are formic acid acceptors; and
(C) about 0.05 to about 5 percent based upon the weight of said copolymer of a phenolic antioxidant which is resistant to a color producing reaction with said (B) stabilizing additive or the decomposition products thereof selected from the group consisting of para bisphenols, paratrisphenols, and paratetrakisphenols.

7. An improved composition according to claim 6 wherein said alkaline earth-metal salt of the defined organic acid is the calcium salt thereof.

8. An improved composition according to claim 6 wherein said alkaline earth-metal salt of the defined organic acid is the barium salt thereof.

9. An improved composition according to claim 6 wherein the metal salt is an alkaline earth-metal salt of a non-nitrogenous organic acid having from 2 through 30 carbon atoms, at least one

group and at least one

group.

10. An improved composition according to claim 9 wherein said metal salt is a ricinoleate of an alkaline earth metal.

11. An improved composition according to claim 10 wherein said metal salt is calicum ricinoleate.

12. An improved composition according to claim 6 wherein said phenolic antioxidant is 4,4'-butylidene-bis(6-tertiary butyl-3-methyl phenol).

References Cited

UNITED STATES PATENTS

| | | | |
|---|---|---|---|
| 3,340,219 | 9/1967 | Stemmler | 260—18 X |
| 3,336,262 | 8/1967 | Sidi | 260—45.95 X |
| 3,240,753 | 3/1966 | Dolce | 260—45.95 |
| 3,236,929 | 2/1966 | Jupa et al. | 260—18 X |

DONALD E. CZAJA, Primary Examiner

C. WARREN IVY, Assistant Examiner

U.S. Cl. X.R.

260—45.7, 45.75, 45.95, 67